United States Patent
Morimoto

(10) Patent No.: US 9,171,468 B2
(45) Date of Patent: Oct. 27, 2015

(54) IN-VEHICLE INFORMATION DISTRIBUTION SYSTEM AND IN-VEHICLE INFORMATION DISTRIBUTION METHOD

(75) Inventor: Kazunari Morimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 195 days.

(21) Appl. No.: 14/113,956

(22) PCT Filed: May 16, 2011

(86) PCT No.: PCT/JP2011/061241
§ 371 (c)(1),
(2), (4) Date: Oct. 25, 2013

(87) PCT Pub. No.: WO2012/157070
PCT Pub. Date: Nov. 22, 2012

(65) Prior Publication Data
US 2014/0049408 A1 Feb. 20, 2014

(51) Int. Cl.
*G08G 1/133* (2006.01)
*B61L 15/00* (2006.01)
(Continued)

(52) U.S. Cl.
CPC .............. *G08G 1/133* (2013.01); *B60L 1/003* (2013.01); *B60L 3/0007* (2013.01); *B60L 9/04* (2013.01);
(Continued)

(58) Field of Classification Search
CPC ............ B61L 15/0081; B61L 15/0072; B61L 15/009; B60L 2250/16; G08G 1/133
USPC .............................................. 340/988, 425.5
See application file for complete search history.

(56) References Cited

U.S. PATENT DOCUMENTS 5,701,980 A 12/1997 Lee
6,374,176 B1 * 4/2002 Schmier et al. ................ 701/465
(Continued)

FOREIGN PATENT DOCUMENTS

JP 10-287242 A 10/1998
JP 10-294702 A 11/1998
(Continued)

OTHER PUBLICATIONS

International Search Report (PCT/ISA/210) mailed on Aug. 16, 2011, by the Japanese Patent Office as the International Searching Authority for International Application No. PCT/JP2011/061241.
(Continued)

*Primary Examiner* — Steven Lim
*Assistant Examiner* — Sisay Yacob
(74) *Attorney, Agent, or Firm* — Buchanan Ingersoll & Rooney PC

(57) ABSTRACT

An in-vehicle information distribution device includes a current-status-information acquisition unit that acquires current-status information, a status-type determination unit that refers to a status-type list table, and determines to which of status types classified in the status-type list table the current-status information corresponds, a status determination unit that refers to a status-type/status-determination-information correspondence table, acquires status-determination information corresponding to the determined status type, and determines a status of a train based on the status-determination information, and a display-content decision unit that refers to a status-type/display-content-information correspondence table, which classifies a display content to be displayed on a display device (AC-drive) and a display device (DC-drive) into status types, acquires display-content information corresponding to the determined status type, and selects display data corresponding to the display-content information.

16 Claims, 7 Drawing Sheets

(51) Int. Cl.
  *B60L 1/00* (2006.01)
  *B60L 3/00* (2006.01)
  *B60L 9/04* (2006.01)
  *B60L 9/12* (2006.01)
  *B60L 9/22* (2006.01)
  *B60L 9/28* (2006.01)
  *B60L 11/18* (2006.01)

(52) U.S. Cl.
  CPC ... *B60L 9/12* (2013.01); *B60L 9/22* (2013.01); *B60L 9/28* (2013.01); *B60L 11/1803* (2013.01); *B60L 11/1805* (2013.01); *B61L 15/009* (2013.01); *B61L 15/0072* (2013.01); *B61L 15/0081* (2013.01); *B60L 2200/26* (2013.01); *B60L 2210/30* (2013.01); *B60L 2210/40* (2013.01); *B60L 2240/12* (2013.01); *B60L 2240/527* (2013.01); *B60L 2250/16* (2013.01)

(56) References Cited

U.S. PATENT DOCUMENTS

| | | | |
|---|---|---|---|
| 6,970,168 | B2 | 11/2005 | Emoto et al. |
| 2003/0023979 | A1* | 1/2003 | Emoto et al. ............... 725/75 |
| 2004/0163451 | A1* | 8/2004 | Kim et al. ............... 73/116 |

FOREIGN PATENT DOCUMENTS

| | | |
|---|---|---|
| JP | 2000-47610 A | 2/2000 |
| JP | 2001-341643 A | 12/2001 |
| JP | 2002-87268 A | 3/2002 |
| JP | 2002-127905 A | 5/2002 |
| JP | 2003-285737 A | 10/2003 |
| JP | 2004-322864 A | 11/2004 |
| JP | 2005-275131 A | 10/2005 |
| JP | 2006-134120 A | 5/2006 |
| JP | 2007-30763 A | 2/2007 |
| JP | 2009-18679 A | 1/2009 |
| JP | 2009-67252 A | 4/2009 |
| JP | 2010-288324 A | 12/2010 |
| WO | WO 02/056593 A1 | 7/2002 |

OTHER PUBLICATIONS

Written Opinion (PCT/ISA/237) mailed on Aug. 16, 2011, by the Japanese Patent Office as the International Searching Authority for International Application No. PCT/JP2011/061241.

European Search Report dated Jun. 29, 2015 issued in corresponding European Patent Appln. No. 11865776.6 (8 pages).

* cited by examiner

FIG.4

| ITEM | | STATUS TYPE | A | B | C | D | E | F | ... | REMARKS (STATE AND THE LIKE OF EACH DEVICE) |
|---|---|---|---|---|---|---|---|---|---|---|
| TRAIN-INFORMATION MANAGEMENT DEVICE | | | ○ | ○ | ○ | ○ | × | ○ | | ○ WHEN IT IS ACTIVATED NORMALLY (× IN OTHER CASES) |
| IN-VEHICLE INFORMATION DISTRIBUTION DEVICE | | | ○ | ○ | ○ | ○ | × | ○ | | ○ WHEN IT IS ACTIVATED NORMALLY (× IN OTHER CASES) |
| DISPLAY DEVICE (DC-DRIVE) | | | ○ | ○ | ○ | ○ | ○ | × | | ○ WHEN IT IS ACTIVATED NORMALLY (× IN OTHER CASES) |
| DISPLAY DEVICE (AC-DRIVE) | | | ○ | × | × | × | × | × | | ○ WHEN IT IS ACTIVATED NORMALLY (× IN OTHER CASES) |
| TRAIN INFORMATION | AUXILIARY POWER SUPPLY DEVICE | | ○ | × | × | × | – | ○ | | × WHEN OUTPUT ELECTRIC POWER FROM AUXILIARY POWER SUPPLY DEVICE IS DECREASED, OR ○ WHEN OUTPUT VALUE IS NORMAL |
| | BATTERY | | ○ | ○ | ○ | ○ | – | ○ | | × WHEN OUTPUT ELECTRIC POWER FROM BATTERY IS DECREASED, OR ○ WHEN OUTPUT VALUE IS NORMAL |
| | PANTO-GRAPH | | ○ | × | ○ | ○ | – | ○ | | ○ WHEN PANTOGRAPH IS RAISED, OR × WHEN PANTOGRAPH IS LOWERED |
| | DOOR STATE | | △ | △ | ○ | × | – | △ | | ○ WHEN DOORS ARE ALL CLOSED, OR × WHEN AT LEAST ONE OF DOORS IS OPEN |
| | TRAIN SPEED | | △ | ○ | ○ | ○ | – | △ | | ○ WHEN TRAIN SPEED IS LOWER THAN 5 km/h, OR × WHEN TRAIN SPEED IS EQUAL TO OR HIGHER THAN 5 km/h |
| | LOCATION BETWEEN STATIONS | | △ | △ | ○ | × | – | △ | | ○ WHEN DISTANCE TO NEAREST STATION IS SHORTER THAN 20 m, OR × WHEN DISTANCE TO NEAREST STATION IS EQUAL TO OR LONGER THAN 20 m |

※ △: EITHER ○ OR × IS ACCEPTABLE
 –: INFORMATION CANNOT BE ACQUIRED BECAUSE TRAIN-INFORMATION MANAGEMENT DEVICE IS NOT ACTIVATED NORMALLY

| STATUS TYPE | STATUS-DETERMINATION INFORMATION |
|---|---|
| A | NORMAL |
| B | NORMAL |
| C | STATE WHERE OVERHEAD WIRE VOLTAGE IS IN POWER-OUTAGE STATE AND DOORS ARE IN CLOSED STATE; HOWEVER, IT IS POSSIBLE TO DETERMINE THAT PASSENGERS CAN OPEN DOOR TO EXIT TRAIN BECAUSE TRAIN IS CLOSE TO STATION |
| D | STATE WHERE OVERHEAD WIRE VOLTAGE IS IN POWER-OUTAGE STATE AND IT IS POSSIBLE TO DETERMINE THAT IT IS DANGEROUS TO EXIT TRAIN BECAUSE TRAIN IS AWAY FROM STATION; HOWEVER, IT IS POSSIBLE TO DETERMINE THAT PASSENGERS PRY DOOR OPEN AND DOOR IS OPEN |
| E | STATE WHERE ONLY DISPLAY DEVICE (DC-DRIVE) IS IN ACTIVATED STATE ALTHOUGH REASON IS NOT CLEAR |
| F | STATE WHERE DISPLAY DEVICES CANNOT DISPLAY IMAGE FOR SOME REASON ALTHOUGH OTHER DEVICES ARE NORMAL |

| STATUS TYPE | DISPLAY-CONTENT INFORMATION |
|---|---|
| A | DESTINATION GUIDE, TRANSFER GUIDE, AND THE LIKE ARE DISPLAYED BASED ON INFORMATION FROM TRAIN-INFORMATION MANAGEMENT DEVICE |
| B | DESTINATION GUIDE, TRANSFER GUIDE, AND THE LIKE ARE DISPLAYED BASED ON INFORMATION FROM TRAIN-INFORMATION MANAGEMENT DEVICE |
| C | "PLEASE OPEN DOOR MANUALLY TO EXIT TRAIN" |
| D | "PLEASE DO NOT EXIT TRAIN BECAUSE IT IS DANGEROUS, AND FOLLOW CREW'S INSTRUCTIONS" |
| E | "PLEASE FOLLOW CREW'S INSTRUCTIONS" |
| F | DEFAULT SCREEN (FOR EXAMPLE, DISPLAYING MANUFACTURER LOGO) |

IN-VEHICLE INFORMATION DISTRIBUTION SYSTEM AND IN-VEHICLE INFORMATION DISTRIBUTION METHOD

FIELD

The present invention relates to an in-vehicle information distribution system that distributes information to passengers in a train mainly by displaying the information, and to an in-vehicle information distribution method.

BACKGROUND

Recently, advertisements greatly affect people due to the diversification of lifestyles. Because many people use railways daily, there are great advertising effects on them within a vehicle through displays and the like, and demand for advertisements is rapidly increasing.

In view of the demand as described above, recently, a display medium, such as an LCD display, is provided at a head jamb portion above a door in a railway vehicle to provide a service of showing traffic information, such as a destination, a station at which trains stop, a traveling location, and delay information, and also showing advertisement images using moving images or still images, through the display medium. Hereinafter, a device that distributes information in a vehicle mainly by displaying the information is referred to as an "in-vehicle information distribution device".

As described above, the in-vehicle information distribution device normally distributes traffic information, advertisement information, and the like. However, it is difficult to display correct traffic information at the time of the occurrence of an accident or a failure. Therefore, under such circumstances, there is a need to display a display guide or an emergency guide appropriate to the circumstances instead of normal display content.

Patent Literature 1 describes an in-vehicle image display system including an image display device, which displays images including advertisements, and an on-train image display server, which manages image data to be played by the image display device. In the in-vehicle image display system, the on-train image display server switches an advertisement image displayed by the image display device to a predetermined image based on emergency-situation information from a train-information management device or a ground emergency-situation detection device.

Patent Literature 2 describes displaying image information for evacuating passengers through an operation by a crew or after automatically detecting an accident, such as derailing.

CITATION LIST

Patent Literatures

Patent Literature 1: Japanese Patent Application Laid-open No. 2005-275131
Patent Literature 2: International Publication No. WO2002/056593

SUMMARY

Technical Problem

An electric train is supplied with DC 1500(V) power, for example, from an overhead wire. The DC power is converted into, for example, AC 100(V) by an auxiliary power supply device (SIV: static inverter) and is then provided to devices. For another example, the AC 100(V) power is supplied to a battery to be further converted into, for example, DC 100(V) and is then provided to devices. That is, devices driven by AC power and devices driven by DC power are typically mounted on a vehicle-mounted device.

When a decrease in overhead-wire voltage has occurred due to a power outage, for example, a device that directly utilizes the AC 100(V) power is stopped. However, a device that is supplied with the DC 100(V) power from the battery is capable of operating for a certain length of time according to the capacity of the battery. For example, in a case where an AC-drive display device and a DC-drive display device are installed, the DC-drive display device is capable of continuing the display for the time being even after the power outage. However, in that case also, in consideration of the capacity of the battery, it is preferable to quickly switch a normal display guide to an emergency guide and display it rather than continuing the normal display guide.

In Patent Literature 1, the image display device acquires emergency-situation information from the train-information management device, for example, and switches images based on this emergency-situation information. However, if the train-information management device itself breaks down, the image display device cannot recognize the occurrence of an emergency situation and it is difficult to switch the image to an emergency guide. Furthermore, in an emergency, a crew can input information to the train-information management device, thereby providing an emergency guide. However, in a case where the crew is not in a state to input information because the crew is dealing with the emergency situation, the train-information management device cannot obtain input information and it is difficult for the image display device to provide an emergency guide appropriate to the emergency situation.

Furthermore, Patent Literature 2 describes displaying image information for evacuating passengers through an operation by a crew. However, when the crew cannot perform an operation because the crew is dealing with the emergency situation, it is difficult to output the image information. Further, Patent Literature 2 describes automatically detecting an accident, such as derailing or fire, and displaying image information for evacuating passengers. However, Patent Literature 2 does not disclose a specific method of determining the status of the occurrence of the accident.

In a conventional in-vehicle information distribution device, switching the display to an emergency guide depends on emergency-situation information from a train-information management device or the like or depends on information input by a crew. Therefore, there is a problem in that, in a case where the train-information management device or the like breaks down or does not have any input therein, or where the crew is not in a state to directly operate the in-vehicle information distribution device, the in-vehicle information distribution device cannot recognize the occurrence of an emergency situation and it is difficult to switch the display to an emergency guide.

The present invention has been achieved in view of the above, and an object of the present invention is to provide an in-vehicle information distribution system and an in-vehicle information distribution method that can automatically switch a display from a normal guide to an emergency guide at the time of the occurrence of an accident or the like even when information on the occurrence of the accident or the like cannot be directly obtained from outside.

Solution to Problem

In order to solve the above problems and achieve the object, the in-vehicle information distribution system according to the present invention includes an electric-power storage device that is installed in a train and outputs DC power by using electric power from an overhead wire as a supply source; a first display device in a vehicle, where the first display device operates by being supplied with AC power obtained by converting electric power from the overhead wire; a second display device in a vehicle, where the second display device operates by using the electric-power storage device as a power source; a train-information management device that operates by using the electric-power storage device as a power source and manages train information including state information on a vehicle-mounted device; and an in-vehicle information distribution device that operates by using the electric-power storage device as a power source and selects display data for an in-vehicle guide to be displayed on the first and second display devices, wherein the in-vehicle information distribution device includes a current-status-information acquisition unit that acquires a plurality of kinds of train information from the train-information management device and acquires state information from each of the first and second display devices, as a group of current-status information, a status-type determination unit that refers to a status-type list table, which classifies a status of the train into a plurality of kinds of status types including at least whether the train is in a normal state according to content of the group of current-status information, and that determines to which of status types classified in the status-type list table the group of current-status information acquired by the current-status-information acquisition unit corresponds, a status determination unit that refers to a status-type/status-determination-information correspondence table, which classifies status-determination information used for determining a status of the train into the status types, that acquires status-determination information corresponding to a status type determined by the status-type determination unit, and that determines a status of the train based on the status-determination information, and a display-content decision unit that refers to a status-type/display-content-information correspondence table, which classifies a display content to be displayed on the first and second display devices into the status types, that acquires display-content information corresponding to a status type determined by the status-type determination unit, and that selects display data corresponding to the display-content information.

Advantageous Effects of Invention

According to the present invention, a display can be automatically switched from a normal guide to an emergency guide at the time of the occurrence of an accident or the like even when information on the occurrence of the accident or the like cannot be obtained from outside.

BRIEF DESCRIPTION OF DRAWINGS

FIG. 4 is a diagram illustrating an example of a status-type list table stored in a status-type list-table storing unit.

FIG. 5 is a diagram illustrating an example of a status-type/status-determination-information correspondence table stored in a status-determination-information storing unit.

FIG. 6 is a diagram illustrating an example of a status-type/display-content-information correspondence table stored in a display-content-information storing unit.

DESCRIPTION OF EMBODIMENTS

Exemplary embodiments of an in-vehicle information distribution system and an in-vehicle information distribution method according to the present invention will be explained below in detail with reference to the drawings. The present invention is not limited to the embodiments.

First Embodiment

Figure 1:
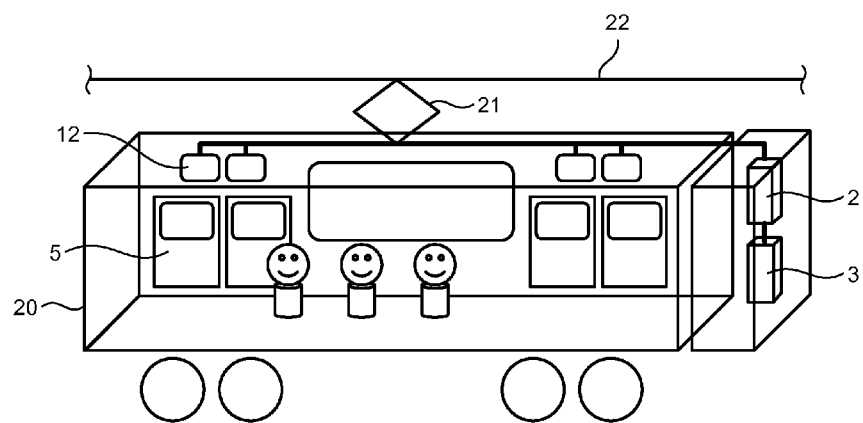
FIG. 1 is a diagram illustrating an example of a vehicle configuration including an in-vehicle information distribution device according to a first embodiment.

FIG. 1 is a diagram illustrating an example of a vehicle configuration including an in-vehicle information distribution device according to the present embodiment. FIG. 1 depicts a vehicle 20 that constitutes a train formation. In the vehicle 20, an in-vehicle information distribution device 2, a plurality of display devices 12, and a train-information management device 3 are shown as an example of a vehicle-mounted device. The in-vehicle information distribution device 2 is connected to the display devices 12 and the train-information management device 3 by a transmission line. The display devices 12 are arranged at head jamb portions above doors 5, for example. The vehicle 20 is supplied with electric power from an overhead wire 22 through a pantograph 21 that is a current collector. While only one vehicle 20 is shown in an example in FIG. 1, a configuration of other vehicles when the formation is constituted by a plurality of vehicles is also the same as the configuration of the vehicle 20.

Figure 2:
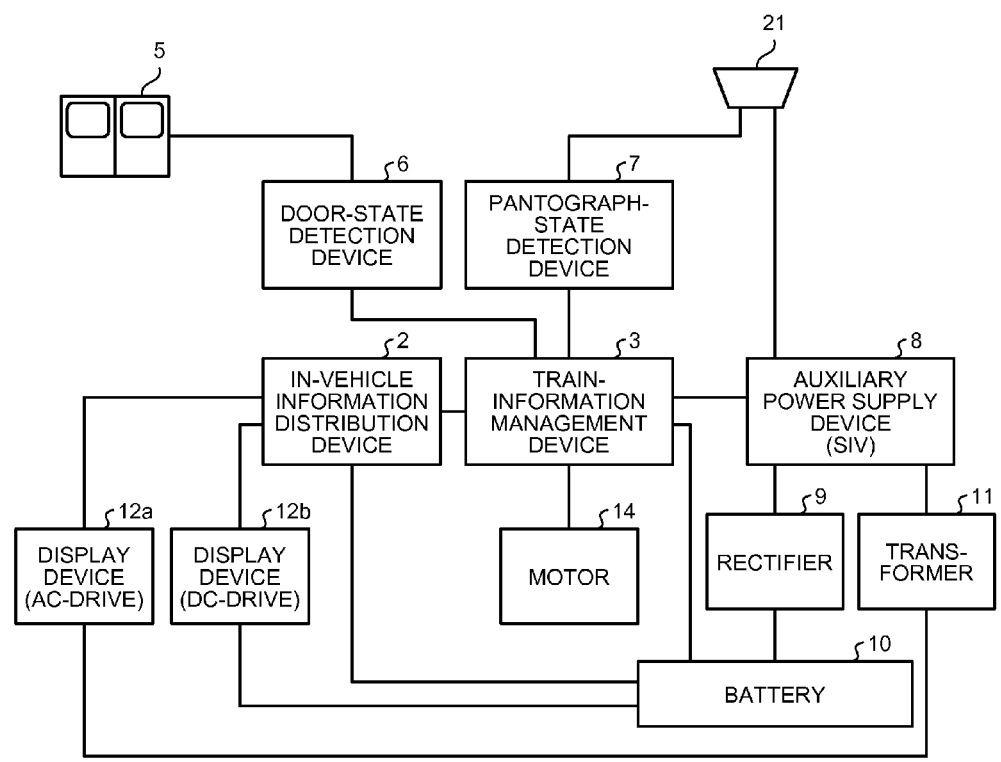
FIG. 2 is a block diagram illustrating an example of a configuration of an in-vehicle information distribution system.

FIG. 2 is a block diagram illustrating an example of a configuration of an in-vehicle information distribution system. In FIG. 2, the in-vehicle information distribution device 2, the train-information management device 3, a display device (AC-drive) 12a, a display device (DC-drive) 12b, a door-state detection device 6, a pantograph-state detection device 7, an auxiliary power supply device (an SIV) 8, a rectifier 9, a battery 10, a transformer 11, and a motor 14 are shown as vehicle-mounted devices. At least one each of the display device (AC-drive) 12a and the display device (DC-drive) 12b is installed in the vehicle 20. A connection line between devices indicates a transmission line through which a signal can be received and transmitted.

The door-state detection device 6 has a function of detecting whether the door 5 is open or closed and notifying the train-information management device 3 of door-state information that is a result of the detection.

The pantograph-state detection device 7 has a function of detecting whether the pantograph 21 is raised (whether the pantograph 21 is in a state capable of receiving electric power from the overhead wire 22) or is lowered (whether the pantograph 21 is in a state incapable of receiving electric power from the overhead wire 22), and notifying the train-information management device 3 of pantograph-state information that is a result of the detection.

The motor 14 has a function of transmitting power for running a train to wheels and notifying the train-information management device 3 of the number of rotations of the wheels. The train-information management device 3 calculates a current train speed from the number of rotations of the motor 14, and manages the train speed.

The auxiliary power supply device (SIV: static inverter) 8 is an electric-power conversion device, and converts DC v1(V) power, for example, supplied from the pantograph 21 into AC v2(V) power, for example, and outputs the AC v2(V) power to the transformer 11 and the rectifier 9. In this example, v1≥v2, where v1 is 1500(V) and v2 is 400(V) as an example. The auxiliary power supply device 8 has a function of notifying the train-information management device 3 of output electric-power information that is information regarding an output electric-power value of the auxiliary power supply device 8.

The transformer 11 converts the AC v2(V) power supplied from the auxiliary power supply device (the SIV) 8 into AC v3(V) power, for example, and then supplies the AC v3(V) power to the display device (AC-drive) 12a. The display device (AC-drive) 12a is a display driven by an alternating current. In this example, v3v2, where v3 is 100(V) as an example.

The rectifier 9 converts the AC v2(V) power supplied from the auxiliary power supply device (the SIV) 8 into DC v3(V) power, for example, and then supplies the DC v3(V) power to the battery 10 that serves as an electric-power storage device.

The battery 10 stores therein electric power supplied from the auxiliary power supply device (the SIV) 8 through the rectifier 9. The battery 10 is connected to main devices in the vehicle 20, for example, to the train-information management device 3, the in-vehicle information distribution device 2, and the display device (DC-drive) 12b. These devices are supplied with and driven by the DC v3(V) power from the battery 10. The battery 10 has a function of notifying the train-information management device 3 of output electric-power information that is information regarding an output electric-power value of the battery 10. When a train includes an electric-power storage device for driving an electric motor (a motor) or an electric-power storage device for driving an auxiliary device, these electric-power storage devices may be utilized as the battery 10.

The train-information management device 3 collects state information on the vehicle-mounted devices, such as door-state information from the door-state detection device 6, pantograph-state information from the pantograph-state detection device 7, output electric-power information from the auxiliary power supply device 8, output electric-power information from the battery 10, and information regarding the number of rotations of the wheels from the motor 14. Furthermore, the train-information management device 3 is installed in each vehicle. The train-information management devices 3 collect and manage train information in cooperation with each other. The train information includes various information, such as train speed information, train traveling-location information, and train traffic information, in addition to the above status information on the vehicle-mounted devices. The train speed information is calculated from the information regarding the number of rotations of the wheels. The train traveling-location information is provided in kilometers from a starting station, for example. By combining the train traffic information including route information and the like with the train traveling-location information, information on a location of a train between stations (such as a distance to the nearest station), which is described later, and other information are also obtained. The train-information management device 3 manages the information described above also as train information.

Furthermore, the train-information management device 3 has a function of notifying the in-vehicle information distribution device 2 of train information required for the display. The train-information management device 3 includes an input unit that enables a crew, such as a driver or a conductor, to input information. The crew can input various information through the input unit, for example, train traffic information (such as destination and train type), and information to instruct the display for requesting passengers to set their mobile phones to silent mode. Examples of the input unit are a touch panel and a switch.

Figure 3:
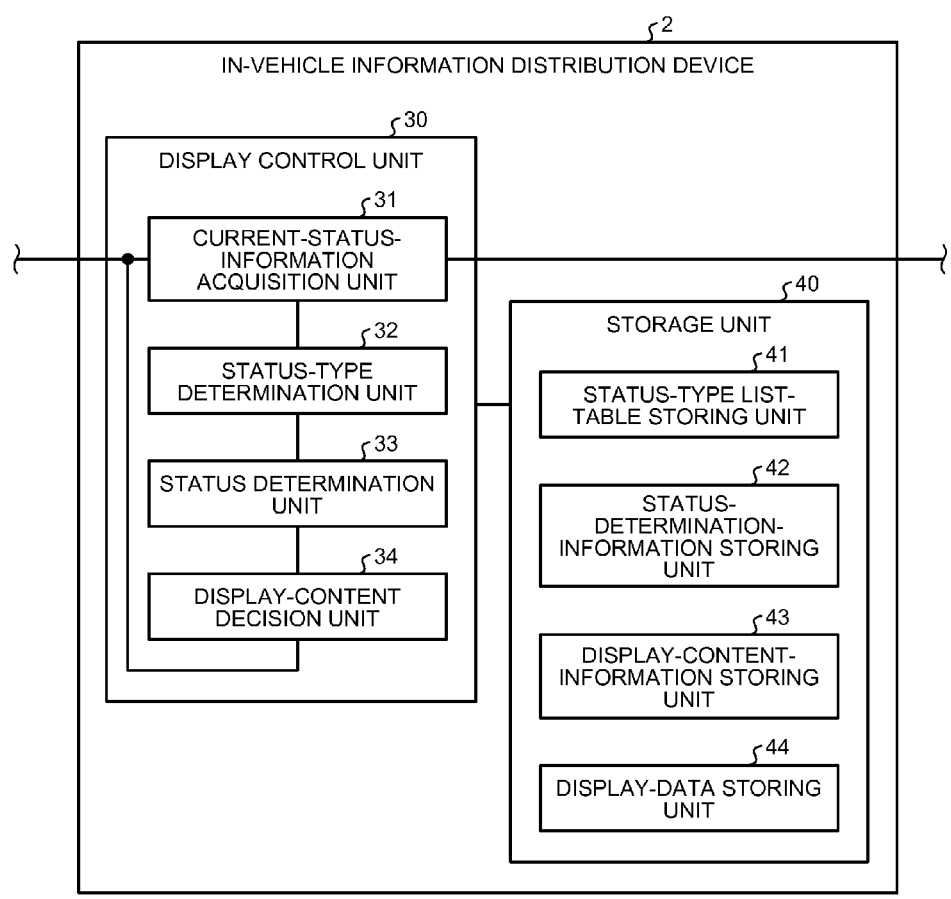
FIG. 3 is a block diagram illustrating an example of a functional configuration of the in-vehicle information distribution device.

Next, a functional configuration of the in-vehicle information distribution device 2 is explained. FIG. 3 is a block diagram illustrating an example of the functional configuration of the in-vehicle information distribution device 2. The in-vehicle information distribution device 2 is configured by including a display control unit 30 and a storage unit 40. The display control unit 30 includes a current-status-information acquisition unit 31, a status-type determination unit 32, a status determination unit 33, and a display-content decision unit 34. The display control unit 30 is configured by hardware, such as a CPU and a memory, and operates according to a predetermined program. The storage unit 40 includes a status-type list-table storing unit 41, a status-determination-information storing unit 42, a display-content-information storing unit 43, and a display-data storing unit 44. The storage unit 40 is constituted by a hard disk, for example. An input/output interface included in the in-vehicle information distribution device 2 is not shown in the drawings.

The current-status-information acquisition unit 31 acquires information regarding a current status of a train (hereinafter, referred to as "current-status information"). The current-status information is constituted by train information, state information on the display devices 12, and the like. That is, the current-status-information acquisition unit 31 acquires a plurality of kinds of train information required for a display control from the train-information management device 3, and acquires state information at least from the display device (AC-drive) 12a and from the display device (DC-drive) 12b. The display device (AC-drive) 12a and the display device (DC-drive) 12b transmit their own state information to the in-vehicle information distribution device 2 regularly, for example. A specific example of the current-status information is described later.

The status-type determination unit 32 refers to a status-type list table stored in the status-type list-table storing unit 41, and determines to which of status types classified in the status-type list table the current-status information collected by the current-status-information acquisition unit 31 corresponds. A specific example of the status-type list table is explained.

FIG. 4 is a diagram illustrating an example of a status-type list table 50 stored in the status-type list-table storing unit 41. In FIG. 4, status types are classified by the content in respective items including "train-information management device", "in-vehicle information distribution device", "display device (DC-drive)", "display device (AC-drive)", "auxiliary power supply device", "battery", "pantograph", "door-state", "train speed", and "location between stations". The items "auxiliary power supply device", "battery", "pantograph", "door state", "train speed", and "location between stations" are items regarding train information obtained from the train-information management device 3. In FIG. 4, six status types A to F are exemplified.

The item "train-information management device" indicates a state of the train-information management device 3, and is expressed as "○" when the train-information management device 3 is normally activated or is expressed as "×" in other states. The item "in-vehicle information distribution device" indicates a state of the in-vehicle information distribution device 2, and is expressed as "○" when the in-vehicle information distribution device 2 is normally activated or is expressed as "×" in other states. The item "display device (DC-drive)" indicates a state of the display device (DC-drive) 12b, and is expressed as "○" when the display device (DC-drive) 12b is normally activated or is expressed as "×" in other states. The item "display device (AC-drive)" indicates a state of the display device (AC-drive) 12a, and is expressed as "○" when the display device (AC-drive) 12a is normally activated or is expressed as "×" in other states. The item "auxiliary power supply device" indicates an output electric-power state of the auxiliary power supply device (the SIV) 8, and is expressed as "○" when an output value is normal or is expressed as "×" when an output value is below the normal output value. The item "battery" indicates an output electric-power state of the battery 10, and is expressed as "○" when an output value is normal or is expressed as "×" when an output value is below the normal output value. The item "pantograph" indicates a state of the pantograph 21, and is expressed as "○" when the pantograph 21 is raised and comes into contact with the overhead wire 22 or is expressed as "×" when the pantograph 21 is lowered and does not come into contact with the overhead wire 22. The item "door state" indicates an open/closed state of the doors 5, and is expressed as "○" when all the doors 5 in the formation are closed or is expressed as "×" when at least one of the doors 5 is open. The item "train speed" is expressed as "○" when a value of the train speed is smaller than 5 km/h, for example, or is expressed as "×" when a value of the train speed is equal to or larger than 5 km/h. The item "location between stations" is expressed as "○" when the distance to the nearest station is shorter than 20 meters, for example, or is expressed as "×" when the distance to the nearest station is equal to or longer than 20 meters. In FIG. 4, "Δ" indicates a case where either "○" or "×" is acceptable, and "–" indicates a case where train information cannot be acquired because the train-information management device 3 is not activated normally.

Next, each status type is explained. The type A indicates a normal operation state. The type B indicates a case where electric power is not supplied in a normal state because the pantograph 21 is lowered. The type C corresponds to a state where electric power cannot be supplied from the pantograph 21, that is, a power-outage state in the overhead wire 22, because although the pantograph 21 is raised, output electric power from the auxiliary power supply device (the SIV) 8 is decreased, and further, other information is indicated to be normal. The type D corresponds to a state where electric power cannot be supplied from the pantograph 21, that is, a power-outage state in the overhead wire 22, because although the pantograph 21 is raised, output electric power from the auxiliary power supply device (the SIV) 8 is decreased, and further, other information is indicated to be normal. Furthermore, the type D is a state where at least one of the doors 5 is open and where the distance from a stop location of a train to the nearest station is equal to or longer than 20 meters. The type E corresponds to a state where only the display device (DC-drive) 12b is activated, and corresponds to a state where the train-information management device 3, the in-vehicle information distribution device 2, and the like are not activated normally. The type F corresponds to a state where only the display device (AC-drive) 12a and the display device (DC-drive) 12b are not activated normally, although other devices are activated normally.

The current-status-information acquisition unit 31 acquires current-status information including information corresponding to all the items in the status-type list table 50. The current-status-information acquisition unit 31 acquires state information on the display device (AC-drive) 12a from the display device (AC-drive) 12a, and acquires state information on the display device (DC-drive) 12b from the display device (DC-drive) 12b. The current-status-information acquisition unit 31 acquires train information required for a display control from the train-information management device 3. This train information includes output electric-power information on the auxiliary power supply device (the SIV) 8, output electric-power information on the battery 10, pantograph-state information, door-state information, train speed information, information on a location between stations. The current-status-information acquisition unit 31 can also acquire train traffic information, such as destination and a station at which trains stop, and other information in addition to those described above as train information. The current-status-information acquisition unit 31 can determine a state of the train-information management device 3 by whether train information can be acquired from the train-information management device 3, and therefore can acquire state information on the train-information management device 3. That is, the current-status-information acquisition unit 31 can determine that the train-information management device 3 is activated normally in a case where train information can be acquired from the train-information management device 3, and can determine that the train-information management device 3 is not activated normally in other cases. Furthermore, in a case where the in-vehicle information distribution device 2 is activated normally, the current-status-information acquisition unit 31 can acquire state information on the in-vehicle information distribution device 2 as its own state. A case where the in-vehicle information distribution device 2 is not activated normally is described later.

The status-type determination unit 32 acquires current-status information from the current-status-information acquisition unit 31, and compares this current-status information with the status types described in the status-type list table 50 in FIG. 4, thereby identifying a status type corresponding to the current-status information. The items listed in FIG. 4 are information to be used for determining whether a train is in a normal state or in an abnormal state (an emergency state). The content of the items in the status-type list table 50 in FIG. 4 is merely an example and is not limited to the example in FIG. 4. Information to be acquired by the status-type determination unit 32 is decided according to the items in the status-type list table 50.

In the status-determination-information storing unit 42, a status-type/status-determination-information correspondence table, which classifies status-determination information used for determining a train status by status type, is stored. The status determination unit 33 refers to the status-type/status-determination-information correspondence table based on the status type identified by the status-type determination unit 32 to acquire status-determination information corresponding to the identified status type, and therefore can determine a train status based on this status-determination information and recognize the train status.

A specific example of the status-type/status-determination-information correspondence table is explained. FIG. 5 is a diagram illustrating an example of a status-type/status-determination-information correspondence table 51 stored in the status-determination-information storing unit 42. The status-type/status-determination-information correspondence table 51 provides status-determination information for each status type.

As shown in FIG. 5, because each of the types A and B is a status that can occur in a normal operation, status-determination information is set to "normal". For the type C, status-determination information is set that indicates "a state where the overhead wire voltage is in a power-outage state and the doors are in a closed state; however, it is possible to determine that passengers can open the door to exit the train because the train is close to the station". For the type D, status-determination information is set that indicates "a state where the overhead wire voltage is in a power-outage state and it is possible to determine that it is dangerous to exit the train because the train is away from the station; however, it is possible to determine that passengers pry the door open and the door is open". For the type E, status-determination information is set that indicates "a state where only the display device (DC-drive) is in an activated state, although the reason for this is not clear". For the type F, status-determination information is set that indicates "a state where the display devices cannot display an image for some reason, although other devices are normal". The setting content is merely an example and is not limited thereto.

When the status type identified by the status-type determination unit 32 is the type A, for example, the status determination unit 33 refers to the status-type/status-determination-information correspondence table, thereby acquiring status-determination information "normal". Therefore, the status determination unit 33 can properly understand that the train status is normal. The same applies to other status types.

Next, in the display-content-information storing unit 43, a status-type/display-content-information correspondence table is stored, in which display content to be displayed on the display devices 12 corresponding to the respective status types is classified by status type. The display-content decision unit 34 refers to the status-type/display-content-information correspondence table based on the status type identified by the status-type determination unit 32, and acquires display-content information, which is to be displayed on the display devices 12, corresponding to the identified status type.

A specific example of the status-type/display-content-information correspondence table is explained. FIG. 6 is a diagram illustrating an example of a status-type/display-content-information correspondence table 52 stored in the display-content-information storing unit 43. The status-type/display-content-information correspondence table 52 provides display-content information for each status type.

As shown in FIG. 6, because each of the types A and B is a normal operation status, display-content information indicating that "the destination guide, the transfer guide, and the like are displayed based on the train information from the train-information management device" is set for the types A and B. This case corresponds to what is called a case of providing a normal guide, in which an advertisement guide and the like can be provided in addition to the destination guide or the transfer guide. In the type C, the overhead wire voltage is in a power-outage state and the doors 5 are in a closed state; however, passengers can open the door to exit the train because the train is close to the station. Therefore, display-content information indicating that "please open the door manually to exit the train" is set for the type C. In the type D, the overhead wire voltage is in a power-outage state and it is possible to determine that it is dangerous to exit the train because the train is away from the station; however, passengers pry the door open and the door is open. Therefore, display-content information indicating that "please do not exit the train because it is dangerous, and follow the crew's instructions" is set for the type D. In the type E, only the display device (DC-drive) 12b is in an activated state, although the reason for this is not clear. Therefore, display-content information indicating that "please follow the crew's instructions" is set for the type E. In the type F, the display devices 12 are not in a state to display an image for some reason, although other devices are normal. Therefore, display-content information indicating that "a default screen is displayed" is set for the type F. On the default screen, the logo of a manufacturer is displayed, for example. The display content related to each of the types C to F corresponds to an emergency guide. The display-content information in FIG. 6 is merely an example of the display content and can be set appropriate to the status-determination information for each status type.

The status-type/status-determination-information correspondence table 51 and the status-type/display-content-information correspondence table 52 may be stored in the storage unit 40 as one table, and each of the status determination unit 33 and the display-content decision unit 34 may refer to this one table.

According to the status-type/display-content-information correspondence table 52, the display-content decision unit 34 acquires display-content information appropriate to the status type identified by the status-type determination unit 32, thereby deciding display content to be displayed on the display devices 12.

In the case of the status type A, for example, because the status type A corresponds to a normal state, the display-content decision unit 34 selects display data for a normal guide from the display-data storing unit 44. In the display-data storing unit 44, display data to be displayed on the display devices 12 is stored. The display data is moving image data or still image data that may be accompanied with a sound or the like. As the display data, display data for a normal guide, such as a destination guide, a transfer guide, and an advertisement guide, is stored in the display-data storing unit 44. Therefore, the display-content decision unit 34 can select the display data for a normal guide from the display-data storing unit 44, and can transmit this display data to both the display device (AC-drive) 12a and the display device (DC-drive) 12b.

In the case of the status type B, for example, the status type B corresponds to a normal state. However, the pantograph 21 is lowered; therefore, the display-content decision unit 34 selects the display data for a normal guide from the display-data storing unit 44, and then transmits this display data to the display device (DC-drive) 12b that is supplied with electric power from the battery 10. The display-content decision unit 34 may also transmit this display data to the display device (AC-drive) 12a. However, the display device (AC-drive) 12a does not operate and therefore cannot display the display data. That is, only the display device (DC-drive) 12b provides the normal guide.

In the case of the status type C or D, each of the status types C and D corresponds to an abnormal state (an emergency state) where an overhead wire voltage is in a power-outage state. Therefore, the display-content decision unit 34 selects display data for an emergency guide according to each of the status types from the display-data storing unit 44, for example, and transmits this display data to the display device (DC-drive) 12b. That is, in the display-data storing unit 44, display data for an emergency guide corresponding to the display-content information on each of the status types C and D can be stored in advance. Instead of storing the display data for an emergency guide in the display-data storing unit 44, the display-content decision unit 34 may create display data for an emergency guide corresponding to each of the status types on each occasion. For another example, the display-content decision unit 34 may select display data for a normal guide (for example, an advertisement image) from the display-data storing unit 44, and may transmit to the display device (DC-drive) 12b the display data for a normal guide, which has been processed such that an emergency guide is reflected in the display data for a normal guide (for example, by displaying the emergency guide in a part of the advertisement image or by downsizing the display area of the advertisement image to display the emergency guide in the margin). Therefore, the display device (DC-drive) 12b can provide the emergency guide. The display-content decision unit 34 may also transmit this display data to the display device (AC-drive) 12a. However, the display device (AC-drive) 12a does not operate and therefore cannot display the display data. That is, only the display device (DC-drive) 12b provides the emergency guide.

The case of the status type E is described later. In the case of the status type F, the display devices 12 are not in a state to display an image. However, when the display devices 12 are capable of providing a screen display, the display-content decision unit 34 selects data for displaying a default screen from the display-data storing unit 44, and transmits this display data to both the display device (AC-drive) 12a and the display device (DC-drive) 12b.

Figure 7:
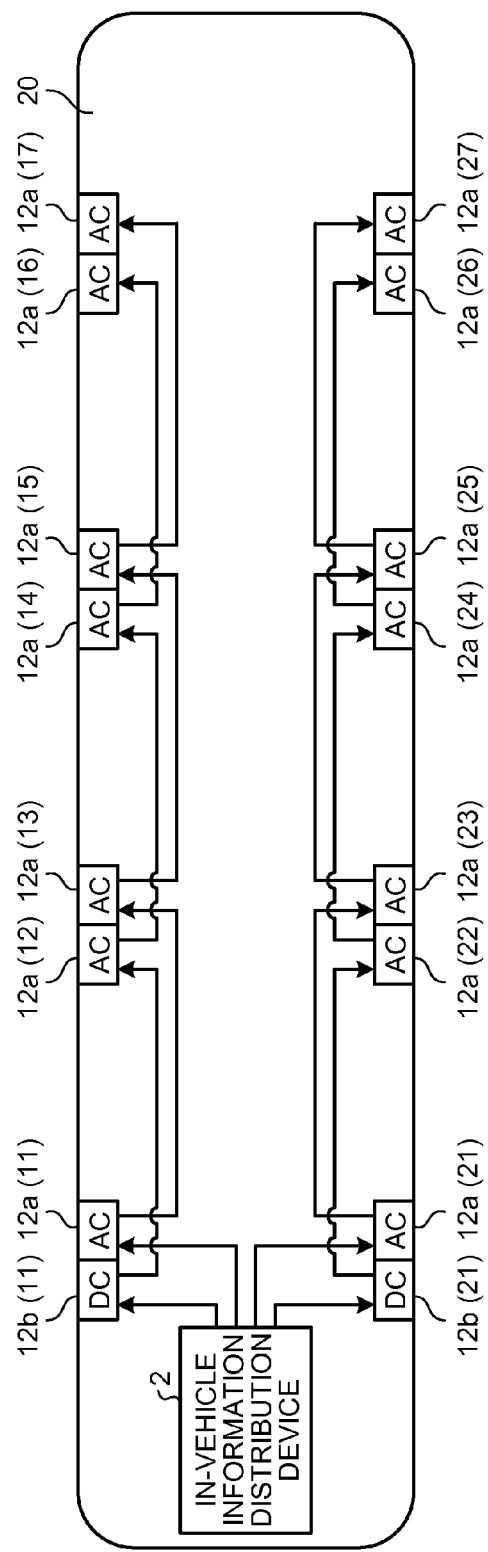
FIG. 7 is a schematic top view illustrating an example of an arrangement configuration of display devices in a vehicle.

An arrangement configuration of the display devices 12 in a vehicle is explained. FIG. 7 is a schematic top view illustrating an example of the arrangement configuration of the display devices 12 in the vehicle. In FIG. 7, the in-vehicle information distribution device 2 is arranged at the end of the vehicle 20, and a pair of the display devices 12 is arranged at a head jamb portion above a door, for example. DC indicates DC drive and AC indicates AC drive. On one side wall of the vehicle 20, a pair of the display device (DC-drive) 12b (11) and the display device (AC-drive) 12a (11), a pair of the display device (AC-drive) 12a (12) and the display device (AC-drive) 12a (13), a pair of the display device (AC-drive) 12a (14) and the display device (AC-drive) 12a (15), and a pair of the display device (AC-drive) 12a (16) and the display device (AC-drive) 12a (17) are arranged in order from the side closer to the in-vehicle information distribution device 2. On the other side wall of the vehicle 20, a pair of the display device (DC-drive) 12b (21) and the display device (AC-drive) 12a (21), a pair of the display device (AC-drive) 12a (22) and the display device (AC-drive) 12a (23), a pair of the display device (AC-drive) 12a (24) and the display device (AC-drive) 12a (25), and a pair of the display device (AC-drive) 12a (26) and the display device (AC-drive) 12a (27) are arranged in order from the side closer to the in-vehicle information distribution device 2.

FIG. 7 depicts a display-data transmission path by the lines with arrows. For example, the in-vehicle information distribution device 2 transmits display data to the display device (DC-drive) 12b (11) and the display device (AC-drive) 12a (11). The display data transmitted to the display device (DC-drive) 12b (11) is then transferred from the display device (DC-drive) 12b (11) to the display device (AC-drive) 12a (12)→the display device (AC-drive) 12a (14)→the display device (AC-drive) 12a (16) in this order. The display data transmitted to the display device (AC-drive) 12a (11) is then transferred from the display device (AC-drive) 12a (11) to the display device (AC-drive) 12a (13)→the display device (AC-drive) 12a (15)→the display device (AC-drive) 12a (17). That is, in the in-vehicle information distribution device 2, the display device (DC-drive) 12b (11), the display device (AC-drive) 12a (12), the display device (AC-drive) 12a (14), and the display device (AC-drive) 12a (16) are connected in a daisy chain. The display data is sequentially transferred through this path. Furthermore, in the in-vehicle information distribution device 2, the display device (AC-drive) 12a (11), the display device (AC-drive) 12a (13), the display device (AC-drive) 12a (15), and the display device (AC-drive) 12a (17) are connected in a daisy chain. The display data is sequentially transferred through this path.

As shown in FIG. 7, the display device (DC-drive) 12b is directly connected to the in-vehicle information distribution device 2. That is, the display device (DC-drive) 12b is arranged closest to the in-vehicle information distribution device 2, and is connected to the in-vehicle information distribution device 2 directly, not via another display device (AC-drive) 12a. With this configuration, under the circumstances such as the status types B to F in FIG. 4, even when electric power is not supplied from the overhead wire 22, the display device (DC-drive) 12b (11) can receive display data directly from the in-vehicle information distribution device 2 and can provide a display guide by using this display data. The connection mode of the display devices 12 arranged on the other side wall of the vehicle 20 is the same as the connection mode described above.

From the viewpoint of the visibility, it is preferable to provide the display device (DC-drive) 12b on both side walls of the vehicle 20 as shown in FIG. 7. However, the display device (DC-drive) 12b may be provided only on one side wall. The number of the display devices (DC-drive) 12b to be provided is not limited to two shown in an example in FIG. 7, and three or more display devices (DC-drive) 12b may be provided. However, as the number of DC-drive display devices 12 to be provided increases, the load on the battery 10 increases. In a case where two or more display devices (DC-drive) 12b are provided on the same side wall, the display devices (DC-drive) 12b are connected directly to each other without interposing the display device (AC-drive) 12a therebetween. For example, in a case where three display devices (DC-drive) 12b are connected, it is satisfactory that the display device (AC-drive) 12a (12) is replaced by a DC-drive display device in FIG. 7. That is, the display device (DC-drive) 12b receives display data directly from the in-vehicle information distribution device 2 or receives display data transmitted from the in-vehicle information distribution device 2 through another display device (DC-drive) 12b.

Figure 8:
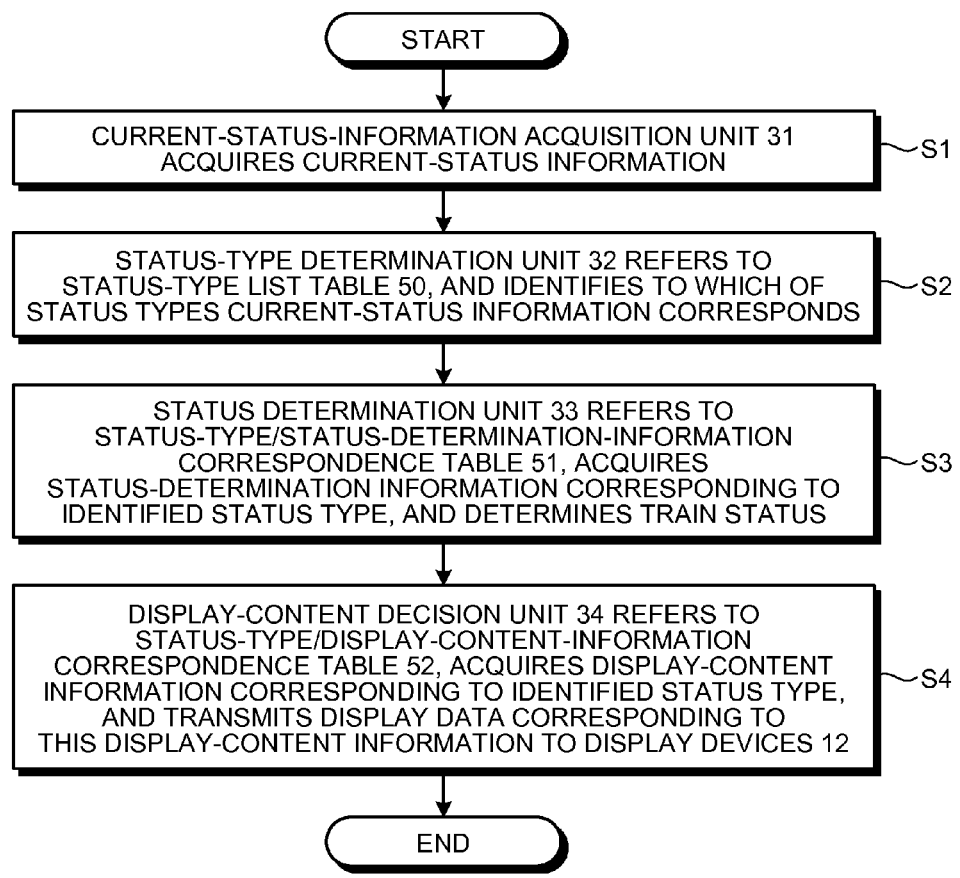
FIG. 8 is a flowchart illustrating an operation of an in-vehicle information distribution device.

Next, an operation according to the present embodiment, particularly, an operation of the in-vehicle information distribution device 2 is explained. FIG. 8 is a flowchart illustrating an operation of the in-vehicle information distribution device 2.

First, the current-status-information acquisition unit 31 acquires current-status information (S1). That is, the current-status-information acquisition unit 31 acquires train information required for a display control from the train-information management device 3, and acquires state information from the display device (AC-drive) 12a and from the display device (DC-drive) 12b.

The status-type determination unit 32 refers to the status-type list table 50 stored in the status-type list-table storing unit 41, and identifies to which of status types classified in the status-type list table 50 the current-status information collected by the current-status-information acquisition unit 31 corresponds (S2).

Next, the status determination unit 33 refers to the status-type/status-determination-information correspondence table 51 stored in the status-determination-information storing unit 42, acquires status-determination information corresponding to the status type identified by the status-type determination unit 32, and determines the status, for example, whether a train is in a normal state or in an abnormal state based on this status-determination information (S3).

Next, the display-content decision unit 34 refers to the status-type/display-content-information correspondence table 52 stored in the display-content-information storing unit 43, acquires display-content information corresponding to the status type identified by the status-type determination unit 32, and selects display data corresponding to this display-content information to transmit the display data to the display devices 12 (S4). At this time, when it is determined that the display device (AC-drive) 12a is not in an activated state based on the content of the status-determination information recognized by the status determination unit 33, the display-content decision unit 34 can transmit the display data only to the display device (DC-drive) 12b.

In a case where the train status is the status type A, the display device (AC-drive) 12a and the display device (DC-drive) 12b display a normal guide by using the display data received from the display-content decision unit 34. In a case where the train status is the status type B, the display device (DC-drive) 12b displays a normal guide by using the display data received from the display-content decision unit 34. In a case where the train status is the status type C or D, the display device (DC-drive) 12b displays an emergency guide by using the display data received from the display-content decision unit 34. In a case where the train status is the status type F, the display device (AC-drive) 12a and the display device (DC-drive) 12b display a default screen, for example, by using the display data received from the display-content decision unit 34.

Next, processing in a case where the train status corresponds to the status type E is explained. In this case, because the in-vehicle information distribution device 2 is not activated normally, it is difficult for the in-vehicle information distribution device 2 to perform the processing as shown in FIG. 8. Therefore, in the present embodiment, the display device (DC-drive) 12b is configured as follows such that the display device (DC-drive) 12b can display an emergency guide even in the case as described above.

Figure 9:
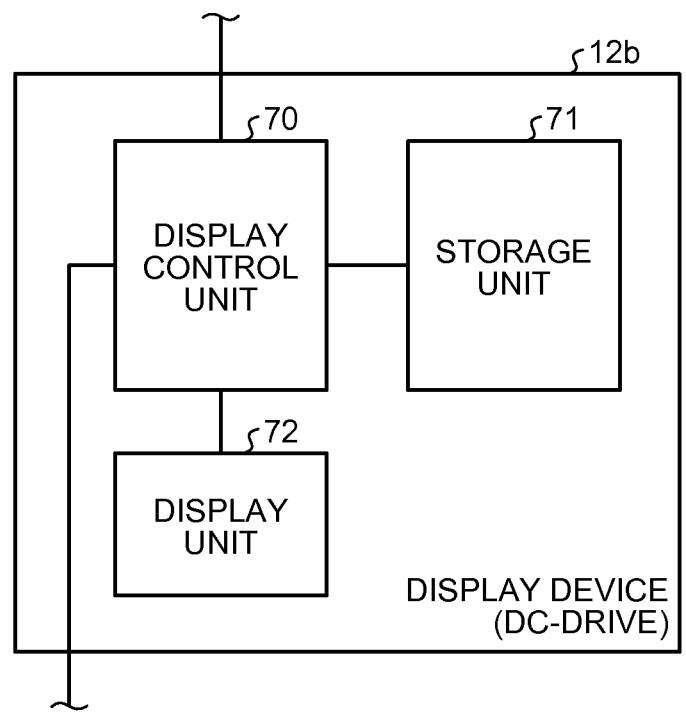
FIG. 9 is a block diagram illustrating an example of a functional configuration of a display device (DC-drive).

First, the display device (DC-drive) 12b is configured as shown in FIG. 9. FIG. 9 is a block diagram illustrating an example of a functional configuration of the display device (DC-drive) 12b. The display device (DC-drive) 12b is configured by including a display control unit 70, a storage unit 71, and a display unit 72. The display control unit 70 is configured by hardware, such as a CPU and a memory, and operates according to a predetermined program. The storage unit 71 is constituted by a hard disk, for example. That is, the display device (DC-drive) 12b is what is called a display device with a CPU, and is configured by including not only the display unit 72 having a display function but also the display control unit 70 having a computation processing function. An input/output interface of the display device (DC-drive) 12b is not shown in the drawings.

Furthermore, the in-vehicle information distribution device 2 transmits its own state information (a health check signal) to the display device (DC-drive) 12b regularly. The display control unit 70 in the display device (DC-drive) 12b constantly monitors the state information transmitted from the in-vehicle information distribution device 2. When transmission of the state information from the in-vehicle information distribution device 2 is discontinued, the display control unit 70 determines that the train status corresponds to the status type E, a failure, such as a breakdown, has occurred in the in-vehicle information distribution device 2, and the in-vehicle information distribution device 2 is not in a normally activated state. Specifically, the status-type list table 50, the status-type/status-determination-information correspondence table 51, and the status-type/display-content-information correspondence table 52 are stored in advance in the storage unit 71, similarly to the storage unit 40. Also, the display control unit 70 is set to refer to the status type E in each table when transmission of the state information from the in-vehicle information distribution device 2 is discontinued, and therefore can acquire status-determination information from the status-type/status-determination-information correspondence table 51 and acquire display-content information from the status-type/display-content-information correspondence table 52. In the storage unit 71, display data corresponding to this display-content information is stored in advance. The display control unit 70 displays an emergency guide by using this display data. It is not necessary to store all the table information described above in the storage unit 71. It is satisfactory that the item information in the status-type list table 50, the status-determination information corresponding to the status type E, and the display-content information corresponding to the status type E are stored therein.

As described above, the display device (DC-drive) 12b constantly monitors state information from the in-vehicle information distribution device 2, determines that a failure has occurred in the in-vehicle information distribution device 2 when transmission of the state information is discontinued, and can display an emergency guide according to the status by using display data for an emergency guide, which is held therein in advance. When any procedure is not supposed to be carried out in a case where the status type E has occurred, the display device (DC-drive) 12b is not necessarily the display device with a CPU as described above and can be simply a display device having a display function only.

In the status type E in FIG. 4, not only the in-vehicle information distribution device 2 but also the train-information management device 3 are not in a normally activated state. However, the same operation as described above is supposed to be performed also in a case where the train-information management device 3 is in a normally activated state while the in-vehicle information distribution device 2 is not activated normally.

As explained above, according to the present embodiment, the in-vehicle information distribution device 2 determines a train status including whether the train is in a normal state or in an abnormal state (an emergency state) by itself based on train information and state information on the display devices 12, and can decide display content according to the train status. Therefore, at the time of the occurrence of an accident or the like (an accident, a disaster, a breakdown, or the like), the in-vehicle information distribution device 2 can switch a display from a normal guide to an emergency guide based on its own determination, even when information on the occurrence of the accident or the like is not input from outside to the in-vehicle information distribution device 2. It is assumed that particularly, at the time of the occurrence of an accident or the like, a driver and a conductor are struggling with understanding the status of the accident and dealing with the accident, and therefore are not in a state to perform input work. Accordingly, the present embodiment is very effective.

According to the present embodiment, an appropriate display can be immediately provided at the time of the occurrence of an accident or the like. This can give passengers a sense of security.

According to the present embodiment, at least one display device (DC-drive) 12b is installed in a vehicle. Therefore, even when a power outage has occurred on the overhead wire 22, the display device (DC-drive) 12b can display an emergency guide by using the battery 10 as a power source.

According to the present embodiment, even when the in-vehicle information distribution device 2 breaks down, the display device (DC-drive) 12b can determine the status by itself and can provide an emergency guide appropriate to the status.

According to the present embodiment, status-determination information and display-content information are set for each status type in advance. Therefore, the in-vehicle information distribution device 2 can specifically understand the status.

According to the present embodiment, the display device (DC-drive) 12b receives display data directly from the in-vehicle information distribution device 2 or receives display data transmitted from the in-vehicle information distribution device 2 through another display device (DC-drive) 12b. Therefore, even when a power outage has occurred on the overhead wire 22, the display data can be reliably acquired.

In the present embodiment, a case where DC power is supplied from the overhead wire 22 is explained, for example. However, the in-vehicle information distribution system can be configured in a similar manner to the above even in a case where AC power is supplied from the overhead wire 22. In this case, it is satisfactory that, for example, a transformer and a converter are interposed between the pantograph 21 and the auxiliary power supply device 8.

In the above explanations, for example, the display content as shown in FIG. 6 is displayed as an example of the display content according to the status types C and D. However, because the status types C and D do not correspond to a normal state, but correspond to an emergency, for example, the content of a status type determined by the status-type determination unit 32 can also be directly used as the display content. For example, each of the status types C and D can also be displayed by expressing each item as "○" or "×" as shown in FIG. 4. This may be unfriendly for passengers. However, an engineer who knows the system configuration can understand the status. In the case of displaying the status type C or D in the manner as described above, display-content information in the status-type/display-content-information correspondence table 52 can be set to use descriptions of the corresponding status type in the status-type list table 50.

The train-information management device 3 can transmit information regarding a distance to the nearest station and a direction of the nearest station (a traveling direction of the train or the direction opposite thereto) to the in-vehicle information distribution device 2 as information on a location between stations. The current-status-information acquisition unit 31 acquires the information regarding a direction of the nearest station and outputs the information to the display-content decision unit 34. When a status type corresponds to the status type C in FIG. 4, the display-content decision unit 34 selects display content corresponding to the status type C in FIG. 6 and also display data showing the direction of the nearest station by an arrow, for example, and can transmit the display content and the display data to the display device (DC-drive) 12b to display them. In this manner, the direction of the nearest station can be shown to passengers, and passengers can be guided immediately and properly.

The display device (AC-drive) 12a and the display device (DC-drive) 12b normally display a destination guide and also sometimes display an advertisement guide. However, when an advertisement remains displayed in an emergency status, some passengers may feel uncomfortable. Therefore, the severity indicating the degree of seriousness of the status is set for each status type in FIG. 4. For example, in a status type in which its severity is set to a value higher than a predetermined value, an advertisement may not be displayed. For example, the severity of the status types A and B is set to 0 and the severity of the status types C to F is set to 1. When the severity is equal to or higher than 1, the display-content decision unit 34 can be set not to select an advertisement. With this configuration, in a case where a decrease in overhead-wire voltage or the like has occurred, such as the case of the status types C and D, an advertisement can be hidden. That is, typically, in the status types C and D also, the display content exemplified in FIG. 6 can be provided together with an advertisement guide. However, by setting the severity, only an emergency guide is displayed, not simultaneously with an advertisement guide. The severity may be also expressed by means other than numerical values.

In a case where a status type is determined to correspond to an emergency status, such as the status type C or D, by the status-type determination unit 32, if the display-content decision unit 34 immediately displays an emergency guide according to the determined status type and if an emergency situation has not actually occurred and the current-status information does not correctly reflect the real status for some reason, the display-content decision unit 34 provides an improper display. Therefore, in order to avoid such an improper display, a timer unit (not shown) that measures a time is provided in the in-vehicle information distribution device 2. Only when it is determined that the status type corresponding to an emergency state has continued for a predetermined time, a normal guide may be switched from a normal guide to an emergency guide.

INDUSTRIAL APPLICABILITY

The present invention is useful as an in-vehicle information distribution system and an in-vehicle information distribution method.

REFERENCE SIGNS LIST 2 in-vehicle information distribution device
3 train-information management device
5 door
6 door-state detection device
7 pantograph-state detection device
8 auxiliary power supply device (SIV)
9 rectifier
10 battery
11 transformer
12 display device
12a display device (AC-drive)
12b display device (DC-drive)
14 motor
21 pantograph
20 vehicle
22 overhead wire
30 display control unit
31 current-status-information acquisition unit
32 status-type determination unit
33 status determination unit
34 display-content decision unit
40 storage unit
41 status-type list-table storing unit
42 status-determination-information storing unit
43 display-content-information storing unit
44 display-data storing unit
50 status-type list table 51 status-type/status-determination-information correspondence table
52 status-type/display-content-information correspondence table

The invention claimed is:

1. An in-vehicle information distribution system comprising:
   an electric-power storage device that is installed in a train and outputs DC power by using electric power from an overhead wire as a supply source;
   a first display device in a vehicle, where the first display device operates by being supplied with AC power obtained by converting electric power from the overhead wire;
   a second display device in a vehicle, where the second display device operates by using the electric-power storage device as a power source;
   a train-information management device that operates by using the electric-power storage device as a power source and manages train information including state information on a vehicle-mounted device; and
   an in-vehicle information distribution device that operates by using the electric-power storage device as a power source and selects display data for an in-vehicle guide to be displayed on the first and second display devices, wherein
   the in-vehicle information distribution device includes
      a current-status-information acquisition unit that acquires a plurality of kinds of train information from the train-information management device and acquires state information from each of the first and second display devices, as a group of current-status information,
      a status-type determination unit that refers to a status-type list table, which classifies a status of the train into a plurality of kinds of status types including at least whether the train is in a normal state according to content of the group of current-status information, and that determines to which of status types classified in the status-type list table the group of current-status information acquired by the current-status-information acquisition unit corresponds,
      a status determination unit that refers to a status-type/status-determination-information correspondence table, which classifies status-determination information used for determining a status of the train into the status types, that acquires status-determination information corresponding to a status type determined by the status-type determination unit, and that determines a status of the train based on the status-determination information, and
      a display-content decision unit that refers to a status-type/display-content-information correspondence table, which classifies a display content to be displayed on the first and second display devices into the status types, that acquires display-content information corresponding to a status type determined by the status-type determination unit, and that selects display data corresponding to the display-content information.

2. The in-vehicle information distribution system according to claim 1, wherein
   in the status-type/status-determination-information correspondence table, status-determination information indicating a normal state is set for a status type where a status of the train is a normal state, and status-determination information indicating an abnormal state is set for a status type where a status of the train is an abnormal state, and
   in the status-type/display-content-information correspondence table, a normal guide is set for a status type where a status of the train is a normal state, and an emergency guide is set for a status type where a status of the train is an abnormal state.

3. The in-vehicle information distribution system according to claim 2, wherein
   in the status-type/display-content-information correspondence table, for a status type where a status of the train is an abnormal state, a description regarding the status type in the status-type list table is set to be used as the emergency guide, and
   when a status type determined by the status-type determination unit corresponds to the abnormal state, the display-content decision unit selects a description content regarding the status type in the status-type list table as the emergency guide.

4. The in-vehicle information distribution system according to claim 2, further comprising:
   a pantograph-state detection device that detects a state of a pantograph that collects electric power from the overhead wire; and
   an auxiliary power supply device that supplies AC power obtained by converting electric power collected by the pantograph to each of the first display device and the electric-power storage device, wherein
   the train-information management device acquires pantograph-state information that is information regarding whether the pantograph is in a state capable of receiving electric power from the overhead wire, from the pantograph-state detection device, and that acquires auxiliary-power-supply-device output-electric-power information that is information regarding an output electric-power value of the auxiliary power supply device, from the auxiliary power supply device,
   the current-status-information acquisition unit acquires at least the pantograph-state information, the auxiliary-power-supply-device output-electric-power information, and state information on each of the first and second display devices as the group of current-status information by acquiring the pantograph-state information and the auxiliary-power-supply-device output-electric-power information from the train-information management device, and
   in the status-type list table, the plurality of kinds of status types are classified by using a classification item regarding at least whether output electric power of the auxiliary power supply device is below a predetermined value, whether the pantograph is in a state capable of receiving electric power from the overhead wire, whether the first display device is capable of being activated normally, and whether the second display device is capable of being activated normally.

5. The in-vehicle information distribution system according to claim 4, wherein
   the train-information management device further acquires electric-power-storage-device output-electric-power information that is information regarding an output electric-power value of the electric-power storage device, from the electric-power storage device,
   the current-status-information acquisition unit further acquires the electric-power-storage-device output-electric-power information from the train-information management device as the group of current-status information, and in the status-type list table, the plurality of kinds of status types are classified by further using a classification item regarding whether output electric power of the electric-power storage device is below a predetermined value.

6. The in-vehicle information distribution system according to claim 5, wherein in the status-type/status-determination-information correspondence table, among the plurality of kinds of status types, for at least a status type where output electric power of the auxiliary power supply device is in a state below the predetermined value and the pantograph is in a state capable of receiving electric power from the overhead wire, status-determination information corresponding to the status type is set to indicate that an overhead wire voltage is in a power-outage state.

7. The in-vehicle information distribution system according to claim 6, further comprising a door-state detection device that detects whether a door of the train is open, wherein
the train-information management device further acquires door-state information that is information regarding whether the door is open from the door-state detection device,
the current-status-information acquisition unit further acquires the door-state information from the train-information management device as the group of current-status information, and
in the status-type list table, the plurality of kinds of status types are classified by further using a classification item regarding whether all doors of the train are closed.

8. The in-vehicle information distribution system according to claim 7, wherein
the train-information management device manages current train-speed information on the train and information on a location of the train between stations as the train information,
the current-status-information acquisition unit further acquires the train-speed information and the information on a location of the train between stations from the train-information management device as the group of current-status information, and
in the status-type list table, the plurality of kinds of status types are classified by further using a classification item regarding whether a train speed is equal to or higher than a predetermined value and whether a distance from a stop location of the train to a nearest station is equal to or longer than a predetermined distance.

9. The in-vehicle information distribution system according to claim 8, wherein
the status-type list table includes a status type where output electric power of the auxiliary power supply device is below the predetermined value, the pantograph is in a state capable of receiving electric power from the overhead wire, output electric power of the electric-power storage device is the predetermined value, the second display is in a normally activated state, all doors of the train are in a closed state, the train speed is lower than the predetermined value, and the distance from the train to a nearest station is shorter than the predetermined distance, and
when the status type is determined by the status-type determination unit, the status determination unit refers to the status-type/status-determination-information correspondence table and acquires information indicating that although an overhead wire voltage is in a power-outage state and a door is in a closed state, the door is capable of being opened to exit a train because the train is close to a station, as status-determination information for the status type, and the display-content decision unit refers to the status-type/display-content-information correspondence table and acquires display-content information indicating "please open a door manually" as display-content information for the status type.

10. The in-vehicle information distribution system according to claim 9, wherein
the information on a location of the train between stations includes information regarding a distance from a current location of the train to a nearest station and a direction of the nearest station, and
when the status-type determination unit determines a status type where output electric power of the auxiliary power supply device is below the predetermined value, the pantograph is in a state capable of receiving electric power from the overhead wire, output electric power of the electric-power storage device is the predetermined value, the second display device is in a normally activated state, all doors of the train are in a closed state, the train speed is lower than the predetermined value, and the distance from the train to a nearest station is shorter than the predetermined distance, the display-content decision unit acquires information regarding the direction of the nearest station from the current-status-information acquisition unit, selects display data having information regarding the direction of the nearest station reflected in the display-content information, and displays the direction of the nearest station on the second display device.

11. The in-vehicle information distribution system according to claim 2, wherein
in the status-type/status-determination-information correspondence table, a severity indicating a degree of seriousness of a status is set for each status type, and
when a status type determined by the status-type determination unit corresponds to the abnormal state and the severity of the status type is higher than a predetermined degree, the display-content decision unit causes the second display device to display only the emergency guide and not to display an advertisement guide.

12. The in-vehicle information distribution system according to claim 2, wherein
the in-vehicle information distribution device includes a timer unit that measures a time, and
when a status type determined by the status-type determination unit corresponds to the abnormal state, the display-content decision unit instructs the second display device to switch a display content from the normal guide to the emergency guide only after it is checked that the status type has continued for a predetermined time by measuring a time by the timer unit.

13. The in-vehicle information distribution system according to claim 1, wherein the second display device receives the display data selected by the display-content decision unit from the in-vehicle information distribution device directly or through a second display device different from the second display device, not via the first display device.

14. The in-vehicle information distribution system according to claim 13, wherein
the second display device and a plurality of the first display devices are provided on one wall surface in the vehicle, and
a transmission path for transmitting the display data from the in-vehicle information distribution device originates from the in-vehicle information distribution device and is configured in a daisy chain in order from the second display device to the first display devices.

15. The in-vehicle information distribution system according to claim 1, wherein
the in-vehicle information distribution device regularly transmits its own state information to the second display device, and
the second display device constantly monitors the state information from the in-vehicle information distribution device, determines that a failure has occurred in the in-vehicle information distribution device when transmission of the state information is discontinued, and displays an emergency guide according to the status by using display data for an emergency guide, which is held therein in advance.

16. An in-vehicle information distribution method of causing an in-vehicle guide to be displayed on a first display device and a second display device by using display data transmitted from an in-vehicle information distribution device in a vehicle of a train in which an electric-power storage device that outputs DC power by using electric power from an overhead wire as a supply source, the first display device in a vehicle, where the first display device operates by being supplied with AC power obtained by converting electric power from the overhead wire, the second display device in a vehicle, where the second display device operates by using the electric-power storage device as a power source, a train-information management device that operates by using the electric-power storage device as a power source and manages train information including state information on a vehicle-mounted device, and the in-vehicle information distribution device that operates by using the electric-power storage device as a power source and selects the display data for an in-vehicle guide to be displayed on the first and second display devices are installed, the method comprising:

a step of acquiring a plurality of kinds of train information from the train-information management device and acquiring state information from each of the first and second display devices, as a group of current-status information, by the in-vehicle information distribution device;

a step of referring to a status-type list table, which classifies a status of the train into a plurality of kinds of status types including at least whether the train is in a normal state according to content of the group of current-status information, and determining to which of status types classified in the status-type list table the acquired group of current-status information corresponds, by the in-vehicle information distribution device;

a step of referring to a status-type/status-determination-information correspondence table, which classifies status-determination information used for determining a status of the train into the status types, acquiring status-determination information corresponding to the determined status type, and determining a status of the train based on the status-determination information, by the in-vehicle information distribution device; and a step of referring to a status-type/display-content-information correspondence table, which classifies a display content to be displayed on the first and second display devices into the status types, acquiring display-content information corresponding to the determined status type, and selecting display data corresponding to the display-content information, by the in-vehicle information distribution device.

* * * * *